(12) United States Patent
Duvalsaint et al.

(10) Patent No.: US 6,348,552 B2
(45) Date of Patent: Feb. 19, 2002

(54) PROCESS FOR PRODUCING FLUOROELASTOMERS

(75) Inventors: Frantz Duvalsaint, Newark; Albert Lloyd Moore, Wilmington, both of DE (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/810,386

(22) Filed: Mar. 16, 2001

Related U.S. Application Data

(62) Division of application No. 09/505,786, filed on Feb. 17, 2000.

(51) Int. Cl.$^7$ ............ C08F 4/34; C08F 214/22; C08F 214/24; C08F 214/26; C08F 214/28
(52) U.S. Cl. .......... 526/227; 526/80; 526/247; 526/249; 526/250; 526/255
(58) Field of Search ................ 526/227, 255, 526/80, 250, 296

(56) References Cited

U.S. PATENT DOCUMENTS 5,077,359 A * 12/1991 Moore .......... 526/206
5,824,755 A * 10/1998 Hayashi .......... 526/206

FOREIGN PATENT DOCUMENTS

| EP | 0824120 A | 2/1998 |
| EP | 0891995 A | 1/1999 |

* cited by examiner

Primary Examiner—Fred Zitomer

(57) ABSTRACT

Fluoroelastomers having copolymerized units of vinylidene fluoride major monomer, at least one other fluorinated major monomer, and at least one cure site monomer are prepared in an aqueous suspension polymerization process using an initiator consisting essentially of a solution of an oil soluble peroxide in a water-soluble hydrocarbon solvent.

6 Claims, No Drawings

PROCESS FOR PRODUCING FLUOROELASTOMERS

This is a division of application Ser. No. 09/505,786, filed Feb. 17, 2000 pending.

FIELD OF THE INVENTION

This invention pertains to a novel process for the production of a fluoroelastomer; more particularly, it pertains to a suspension polymerization process for the production of a fluoroelastomer comprising copolymerized units of vinylidene fluoride, units of at least one other fluorinated major monomer and units of at least one cure site monomer and wherein said fluoroelastomer has substantially no ionic endgroups.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride ($VF_2$) and units of at least one other copolymerizable fluorine-containing major monomer such as hexafluoropropylene (HFP), tetrafluoroethylene (TFE), chlorotrifluoroethylene (CTFE), vinyl fluoride (VF), and a perfluoro(alkyl vinyl ether) (PAVE). Specific examples of PAVE include perfluoro(methyl vinyl ether), perfluoro(ethyl vinyl ether) and perfluoro(propyl vinyl ether).

In order to develop the physical properties necessary for some end use applications, fluoroelastomers must be crosslinked. Typical curatives for promoting crosslinking include polyamines, polyols and the combination of an organic peroxide and a multifunctional unsaturated coagent. All these compounds form crosslinks by reacting with a cure site on the fluoroelastomer polymer chain. Examples of cure sites include a double bond, or a labile hydrogen, bromine, iodine, or chlorine atom. A common method of introducing a cure site into a fluoroelastomer made by continuous emulsion polymerization is to continuously add a minor amount of a copolymerizable cure site monomer, along with the major monomers (e.g. $VF_2$, HFP, TFE, PAVE, etc.) to the polymerization reactor. In this manner, cure sites are randomly distributed along the resulting fluoroelastomer polymer chain. Suitable cure site monomers include bromine- or iodine-containing olefins, and bromine- or iodine-containing unsaturated ethers, non-conjugated dienes and 2-hydropentafluoropropylene (2-HPFP). Alternatively, or in addition to cure site monomers, cure sites may be introduced into the fluoroelastomer by conducting the polymerization in the presence of a chain transfer agent containing iodine, bromine or both. In this manner, a bromine or iodine atom is attached to the resulting fluoroelastomer polymer chain at one or both ends. Such chain transfer agents typically have the formula $RI_n$, $RBr_n$ or RBrI, where R may be a $C_1$–$C_3$ hydrocarbon, a $C_1$–$C_6$ fluorohydrocarbon or chlorofluorohydrocarbon, or a $C_2$–$C_8$ perfluorocarbon, and n is 1 or 2.

Production of such fluoroelastomers by emulsion and solution polymerization methods is well known in the art; see for example U.S. Pat. No. 4,214,060. Generally, fluoroelastomers are produced in an emulsion polymerization process wherein a water-soluble polymerization initiator and a relatively large amount of surfactant are employed. The resulting fluoroelastomer leaves the reactor in the form of a latex which must be degassed (i.e. freed from unreacted monomers), coagulated, filtered and washed. Emulsion processes suffer from several disadvantages including production of polymers having high Mooney viscosity, which tends to make it difficult to process these materials (i.e. mixing, extruding, molding) into cured articles, due to the presence of ionic endgroups on the fluoroelastomer polymer chains. Another disadvantage is that the polymer products contain impurities from retained surfactants, coagulants, buffers and defoamers. milliequivalents of ionic endgroups per kg fluoroelastomer. Ionic (or ionizable) endgroups include, but are not limited to, sulfate, sulfonate, sulfonic acid, carboxyl and carboxylate endgroups.

In particular, the present invention is directed to a suspension process for producing a fluoroelastomer having a selected molar ratio of copolymerized monomer units, said fluoroelastomer comprising copolymerized units of vinylidene fluoride major monomer, at least one other copolymerizable fluorinated major monomer, and at least one cure site monomer, comprising the steps of:

(A) charging a reactor with a quantity of an aqueous medium comprising a suspension stabilizer, said suspension stabilizer being present in said aqueous medium at a concentration of 0.001 to 3 parts by weight per 100 parts of said aqueous medium; said quantity of aqueous medium being such that a sufficient vapor space is left in said reactor for receiving gaseous monomer;

(B) charging the vapor space in said reactor with an initial quantity of a gaseous monomer mixture comprising vinylidene fluoride major monomer and at least one other fluorinated major monomer; and continuously mixing said aqueous medium and said monomer mixture to form a dispersion;

(C) initiating polymerization of said monomers at a temperature of 45° C. to 70° C. by adding to said dispersion an oil soluble organic peroxide polymerization initiator in an amount of 0.001 to 5 parts by weight per 100 parts of said aqueous medium, said initiator being added as a solution consisting essentially of 0.1 to 75 wt. % of an oil soluble organic peroxide in a water-soluble hydrocarbon solvent; and (D) incrementally feeding to said reactor, during polymerization, so as to maintain a constant pressure in said reactor, said major monomers and at least one On the other hand, in a suspension polymerization process, polymerization is carried out by dispersing one or more monomers, or an organic solvent with monomer dissolved therein, in water and using an oil-soluble organic peroxide. No surfactant or buffer is required and fluoroelastomer is produced in the form of polymer particles which may be directly filtered, i.e. without the need for coagulation, and then washed, thus producing a cleaner polymer than that resulting from an emulsion process. Also, the fluoroelastomer polymer chains are substantially free of ionic endgroups so that the Mooney viscosity is relatively low and the polymer has improved processability compared to polymer produced by an emulsion process (U.S. Pat. Nos. 3,801,552, 4,985,520 and 5,824,755).

A disadvantage of suspension polymerization processes disclosed in the prior art is that it is difficult to incorporate a cure site monomer uniformly into the polymer because polymerization rate and polymer molecular weight increase throughout the reaction period. Many cure site monomers, if present in excess, greatly hinder the polymerization reaction, so that the desired polymerization rate and polymer molecular weight can not be attained in suspension polymerization processes of the prior art.

SUMMARY OF THE INVENTION

In one aspect, the present invention provides a suspension polymerization process for the production of fluoroelastomers having uniformly distributed copolymerized units of one or more cure site monomers. The fluoroelastomers are characterized by having molecular weights sufficiently high to permit processing and curing using conventional techniques.

A further aspect of the invention relates to production of fluoroelastomer products which are substantially free of ionic endgroups. Such fluoroelastomers have lower Mooney viscosities than fluoroelastomers of similar comonomer composition and molecular weight produced from an emulsion polymerization process. By "substantially no ionic endgroups" is meant fewer than 1 cure site monomer, said major monomers and said cure site monomer being fed to the reactor in said selected molar ratio until a fluoroelastomer product having a number average molecular weight of between 50,000 to 2,000,000 daltons is obtained.

Optionally, a chain transfer agent may be added near the beginning of the polymerization process and additional quantities may be introduced throughout the process.

Another embodiment of this invention is the fluoroelastomer produced by the above process of this invention. Such a fluoroelastomer may be distinguished from a fluoroelastomer made by a different polymerization process in that fluoroelastomers of this invention i) are substantially free of ionic endgroups (as defined above), ii) contain polymer chain endgroups derived from an oil-soluble organic peroxide polymerization initiator, and iii) contain copolymerized units of a cure site monomer.

DETAILED DESCRIPTION OF THE INVENTION

The present invention is directed to a suspension polymerization process for producing a fluoroelastomer which contains copolymerized units of vinylidene fluoride ($VF_2$), units of at least one other fluorine-containing copolymerizable major monomer, and units of at least one cure site monomer. By "major monomer" is meant any copolymerizable monomer other than a cure site monomer. The resulting fluoroelastomer has a lower Mooney viscosity and fewer ionic endgroups than does a fluoroelastomer of the same monomer composition and molecular weight that is produced from an emulsion polymerization process. Fluoroelastomers produced by the suspension polymerization process of this invention have improved processability (i.e. improved extrudability, ease of mixing, moldability and demolding).

According to the present invention, fluorine-containing major monomers copolymerizable with $VF_2$ include, but are not limited to, hexafluoropropylene (HFP), tetrafluoroethylene (TFE), chlorotrifluoroethylene (CTFE) and a perfluoro (alkyl vinyl) ether (PAVE).

Perfluoro(alkyl vinyl ethers) (PAVE) suitable for use as monomers include those of the formula $$CF_2=CFO(R_f'O)_n(R_f''O)_mR_f \qquad (I)$$

where $R_f'$ and $R_f''$ are different linear or branched perfluoroalkylene groups of 2–6 carbon atoms, m and n are independently 0–10, and $R_f$ is a perfluoroalkyl group of 1–6 carbon atoms.

A preferred class of perfluoro(alkyl vinyl ethers) includes compositions of the formula $$CF_2=CFO(CF_2CFXO)_nR_f \qquad (II)$$

where X is F or $CF_3$, n is 0–5, and $R_f$ is a perfluoroalkyl group of 1–6 carbon atoms.

A most preferred class of perfluoro(alkyl vinyl ethers) includes those ethers wherein n is 0 or 1 and $R_f$ contains 1–3 carbon atoms. Examples of such perfluorinated ethers include perfluoro(methyl vinyl ether) (PMVE) and perfluoro (propyl vinyl ether) (PPVE). Other useful monomers include compounds of the formula $$CF_2=CFO[(CF_2)_mCF_2CFZO]_nR_f \qquad (III)$$

where $R_f$ is a perfluoroalkyl group having 1–6 carbon atoms,
m=0 or 1, n=0–5, and Z=F or $CF_3$.
Preferred members of this class are those in which $R_f$ is $C_3F_7$, m=0, and n=1.

Additional perfluoro(alkyl vinyl ether) monomers include compounds of the formula $$CF_2=CFO[(CF_2CF\{CF_3\}O)_n(CF_2CF_2CF_2O)_m(CF_2)_p]C_xF_{2x+1} \qquad (IV)$$

where m and n independently=0–10, p=0–3, and x=1–5. Preferred members of this class include compounds where n=0–1, m=0–1, and x=1.

Additional examples of useful perfluoro(alkyl vinyl ethers) include $$CF_2=CFOCF_2CF(CF_3)O(CF_2O)_mC_nF_{2n+1} \qquad (V)$$

where n=1–5, m=1–3, and where, preferably, n=1.

PAVE-containing fluoroelastomers of the invention contain between 23 and 65 wt. % copolymerized $VF_2$ units, preferably between 30 and 65 wt. % of such units. If less than 23 wt. % vinylidene fluoride units are present, the polymerization rate is very slow. In addition, good low temperature flexibility cannot be achieved. Vinylidene fluoride levels above 65 wt. % result in polymers that contain crystalline domains and are characterized by poor low temperature compression set resistance and reduced fluids resistance.

The PAVE content of the PAVE-containing fluoroelastomers of the invention ranges from 25 to 75 wt. %. If perfluoro(methyl vinyl ether) is used, then the fluoroelastomer preferably contains between 30 and 40 wt. % copolymerized PMVE units. If less than 25 wt. % perfluoro(alkyl vinyl ether) is present, the low temperature properties of the fluoroelastomers are adversely affected.

Copolymerized units of tetrafluoroethylene may also be present in the PAVE-containing fluoroelastomers of the invention at levels up to 30 wt. %. The presence of copolymerized units of TFE is desirable for the purpose of increasing fluorine content without unduly compromising low temperature flexibility. High fluorine content promotes good fluid resistance. If TFE is present as a monomer, it is preferably copolymerized in amounts of at least 3 wt. %. Levels of 3 wt. % or greater TFE lead to improved fluid resistance in some end use applications. TFE levels above 30 wt. % result in some polymer crystallinity which affects low temperature compression set and flexibility.

Fluoroelastomers containing units of PAVE are especially preferred in the present invention because of the combination of good low temperature sealing properties and good fluid resistance of these cured fluoroelastomers. Also, when 2-hydropentafluoropropylene cure site monomer is incorporated into PAVE-containing fluoroelastomers made by the suspension process of this invention, the fluoroelastomers show enhanced polyol curability compared to PAVE-containing fluoroelastomers made by an emulsion process.

The fluoroelastomers of the present invention also comprise units of one or more cure site monomers. Examples of suitable cure site monomers include: 2-hydropentafluoropropylene (2-HPFP, also referred to in the art as 1,1,3,3,3-pentafluoropropene); a non-conjugated diene (resulting in a reactive double bond cure site); a bromine- or iodine-containing olefin; and a bromine- or iodine-containing unsaturated ether. Units of cure site monomer are typically present in fluoroelastomers at a level of 0.3–7 wt. %, preferably 0.5–5 wt. % and most preferably between 0.7 and 3 wt %.

Brominated cure site monomers may contain other halogens, preferably fluorine. Examples of brominated olefin cure site monomers are bromotrifluoroethylene; 4-bromo-3,3,4,4-tetrafluorobutene-1(BTFB); and others such as vinyl bromide, 1-bromo-2,2-difluoroethylene; perfluoroalkyl bromide; 4-bromo-1,1,2-trifluorobutene; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated unsaturated ether cure site monomers useful in the invention include 2-bromo-perfluoroethyl perfluorovinyl ether and fluorinated compounds of the class $CF_2Br—R_f—O—CF=CF_2$, such as $CF_2BrCF_2O—CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2OCF=CFBr$.

Suitable iodinated cure site monomers include iodinated olefins of the formula: $CHR=CH—Z—CH_2CHR—I$, wherein R is —H or —CH$_3$; Z is a $C_1$-$C_{18}$ (per) fluoroalkylene radical, linear or branched, optionally containing one or more ether oxygen atoms, or a (per) fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3 -hexafluoro-2-iodo-1-(perfluorovinyloxy)propane; 2-iodoethyl vinyl ether; 3,3,4, 5,5,5-hexafluoro-4-iodopentene; and iodotrifluoroethylene are disclosed in U.S. Pat. No. 4,694,045. Allyl iodide and 2-iodo-perfluoroethyl perfluorovinyl ether are also useful cure site monomers.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; and bromotrifluoroethylene. When the fluoroelastomer will be cured with a polyol, 2-HPFP is the preferred cure site monomer.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005–5 wt. %, preferably 0.05–3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4, tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Cure site monomers and chain transfer agents are typically added to the reactor as liquid solutions in the same solvent that is employed for the oil-soluble peroxide polymerization initiator (described below). In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

In the suspension polymerization process of this invention, (1) a gaseous monomer mixture of a desired composition (initial monomer charge) is introduced into the vapor space above an aqueous medium in a reactor. The aqueous medium comprises a suspension stabilizer in an amount of 0.001–3 parts (by weight) per 100 parts (by weight) of the aqueous medium. The monomer mixture is then dispersed in the aqueous medium and, optionally, a chain transfer agent is also added while the reaction mixture is agitated, typically by mechanical stirring. In the initial gaseous monomer charge, the relative amount of each monomer is dictated by reaction kinetics and is set so as to result in a fluoroelastomer having the desired (i.e. selected) molar ratio of copolymerized monomer units (e.g. very slow reacting monomers must be present in a higher molar amount relative to the other monomers than is desired in the composition of the fluoroelastomer to be produced); (2) the temperature of the reaction mixture is maintained in the range of 45° C.–70° C., preferably 50° C.–60° C.; (3) the suspension polymerization reaction is then initiated by adding an oil-soluble organic peroxide in an amount so as to result in between 0.001 and 5 parts by weight peroxide per 100 parts by weight of the aqueous medium. The peroxide is added as a solution consisting essentially of an oil-soluble organic peroxide in a water-soluble hydrocarbon solvent. Depending upon the nature of the fluoroelastomer to be produced and the total polymerization time, it may be necessary to add additional peroxide initiator to the reactor during the course of polymerization in order to keep the level of peroxide within the above range; and (4) additional quantities of the gaseous major monomers and cure site monomer (incremental feed) are added at a controlled rate throughout the polymerization in order to maintain a constant reactor pressure at a controlled temperature. Since polymerization rate constantly increases over the course of the reaction period, the flow rate of gaseous major monomer and cure site monomer must be increased over the course of the reaction period in order to maintain constant pressure within the reactor. The relative amount (i.e. molar ratio) of both the gaseous major monomers and cure site monomer in the incremental feed is approximately the same as the selected molar ratio of copolymerized monomer units in the fluoroelastomer to be prepared. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoroelastomer because the composition of the initial charge may not be exactly that required for the selected final fluoroelastomer composition, or because a portion of the monomers in the incremental feed may dissolve into the polymer particles already formed, without reacting. However, in practice, the compositions of the initial charge and the incremental feed are often very similar to each other and to the composition of copolymerized monomer units desired in the fluoroelastomer to be produced. Polymerization times in the range of from 3 to 50 hours are employed in this invention.

The polymerization temperature is maintained in the range of 45° C.–70° C. If the temperature is below 45° C., the rate of polymerization is too slow for efficient reaction on a commercial scale, while if the temperature is above 70° C., suspended particles of the fluoroelastomer copolymer formed become sticky and are liable to cause plugging in the polymerization reactor and make it difficult to maintain a stable state of suspension during the polymerization reaction.

The polymerization pressure is in the range of 0.7 to 3.5 MPa, preferably 1.0 to 2.5 MPa. The desired polymerization pressure is initially achieved by adjusting the amount of gaseous monomers in the initial charge, and after the reaction is initiated, the pressure is adjusted by controlling the incremental gaseous monomer feed. The polymerization pressure is set in the above range because if it is below 0.7 MPa, the monomer concentration in the polymerization reaction system is too low to obtain a satisfactory reaction rate. In addition, the molecular weight does not increase sufficiently. If the pressure is above 3.5 MPa, the amount of monomer liquefied in the reactor is increased, thereby merely increasing the amount of monomer which is not consumed, resulting in poor production efficiency.

It is very important that cure site monomers, other than 2H—PFP, not be present prior to initiation of the polymerization reaction. It is also important that cure site monomer introduced in the incremental feed not be added to the reactor in an excess molar amount. Otherwise, polymerization is terminated early and only low molecular weight fluoroelastomers are produced. The fluoroelastomers produced by this invention have number average molecular weights in the range of about 50,000 to 2,000,000 daltons. To obtain fluoroelastomers of such molecular weights having uniform composition of copolymerized units of major monomers and cure site monomer, cure site monomer must be added with the incremental feed in a set ratio equal to the selected level to be incorporated into the polymer. Cure site comonomer addition is controlled such that the ratio of cure site monomer to total incremental monomer feed is in the range of 0.3 wt. % to 7 wt. %, preferably in the range of 0.5 wt. % to 5 wt. %.

It is relatively easy to control the flow rate of incremental feed gaseous major monomers in order to maintain constant pressure within the reactor throughout the entire polymerization reaction period. However, controlling the flow rate of the liquid cure site monomer solution may be problematic. In the case of the gaseous major monomers, a pressure controller may simply increase the flow rate of gaseous monomer to the reactor in order to maintain constant pressure within the reactor as polymerization rate increases. In the early stages of the polymerization reaction, when the polymerization rate is low, and flow rate of gaseous major monomer incremental feed is very small, it may be necessary to use a gas accumulator between the reactor and major monomer source in order to accurately control the flow rate and thus maintain constant pressure within the reactor.

The flow rate of gaseous major monomer must be maintained in a set proportion to the flow rate of liquid cure site monomer solution throughout the entire reaction in order to produce a fluoroelastomer of uniform composition having the selected molar ratios of copolymerized units of major monomers and cure site monomer. Therefore as the flow rate of gaseous major monomers is increased during the reaction period, the flow rate of the liquid cure site monomer solution must be simultaneously increased by a proportional amount. One skilled in the art will readily recognize several means to accomplish this. For example, a flow rate monitor may be placed in the gaseous monomer incremental feed line and then the flow rate of the liquid cure site monomer can be increased proportionally, either manually or automatically, as the flow rate of gaseous monomer is increased. Alternatively, the average flow rate of gaseous major monomer may be determined over several discrete time periods throughout the total reaction time. The flow rate of the cure site monomer can then be set proportionally to the average gaseous monomer flow rate during each discrete time period.

The amount of fluoroelastomer copolymer formed is approximately equal to the amount of incremental feed charged, and is in the range of 10–300 parts by weight of copolymer per 100 parts by weight of aqueous medium, preferably in the range of 20–250 parts by weight of the copolymer.

The degree of copolymer formation is set in the above range because if it is less than 10 parts by weight, productivity is undesirably low, while if it is above 300 parts by weight, the solids content becomes too high for satisfactory stirring.

Oil-soluble organic peroxides which may be used to initiate polymerization in this invention include, for example, dialkylperoxydicarbonates, such as diisopropylperoxydicarbonate (IPP), di-sec-butylperoxydicarbonate, di-sec-hexylperoxydicarbonate, di-n-propylperoxydicarbonate, and di-n-butyl peroxydicarbonate; peroxyesters, such as tert-butylperoxyisobutyrate and tert-butylperoxypivalate; diacylperoxides, such as dipropionyl peroxide; and di(perfluoroacyl)peroxides or di(chlorofluoroacyl)peroxides such as di(perfluoropropionyl)peroxide and di(trichlorooctafluorohexanoyl)peroxide.

The use of dialkylperoxydicarbonates is preferable, and the use of IPP is most preferred. These oil soluble organic peroxides may be used alone or as a mixture of two or more types. The amount to be used is selected generally in the range of 0.001–5 parts by weight per 100 parts by weight of the aqueous medium, preferably 0.01–3 parts by weight. During polymerization some of the fluoroelastomer polymer chain ends are capped with fragments generated by the decomposition of these peroxides.

In the suspension polymerization process of the invention, the oil-soluble organic peroxide is added to the reactor as a solution consisting essentially of 0.1–75 wt % (preferably 1–60 wt. %) peroxide in a water-soluble hydrocarbon solvent. If the concentration of peroxide is over 75 wt %, the organic peroxide concentration is too high for safe transportation. On the other hand, if it is below 0.1 wt %, the concentration is so low that the amount of solvent to be recovered after polymerization becomes undesirably high.

The water-soluble hydrocarbon solvent contains no halogen atoms and is represented by the general formulas $R_1OH$, $R_2COOR_1$, or $R_1COR_3$, where $R_1$ and $R_3$ are methyl or t-butyl groups, and $R_2$ is hydrogen, a methyl group or a t-butyl group. The hydrocarbon solvents useful in the present invention do not have substantial adverse effects on the polymerization reaction because the chain transfer reactivity of these hydrocarbon solvents is relatively small. At the same time, they are soluble in the aqueous reactor medium. Further, only small amounts are contained in droplets comprised of the monomers and oil soluble organic peroxide in which the polymerization reaction occurs. Also, polymerization conditions are set so that both solvent and monomer concentrations are low (generally less that 10 wt. %) in the fluoroelastomer copolymer formed in the reactor. Thus recovery of the solvent and monomers is not difficult.

Specific examples of water-soluble, non-halogenated hydrocarbon solvents useful in this invention are methanol, tert-butyl alcohol, methyl formate, tert-butyl formate, methyl acetate, tert-butyl acetate, methyl pivalate, tert-butyl pivalate, acetone, methyl tert-butyl ketone, and di-tert-butyl ketone. The use of methanol, tert-butyl alcohol, methyl acetate, or tert-butyl acetate is preferable. Methyl acetate or tert-butyl acetate are most preferred. These solvents may be used alone or as a combination of two or more types.

Suspension stabilizers useful in the present invention include, for example, methyl cellulose, carboxymethyl cellulose, bentonite, talc, and diatomaceous earth. Methyl cellulose is preferred. Typically the number average molecular weight of the methyl cellulose is between 15,000 and 70,000. These suspension stabilizers may be used alone or as a combination of two or more types. The amount utilized is generally in the range of 0.001–3 parts by weight, preferably 0.01–1 part by weight per 100 parts by weight of the aqueous medium.

The monomer composition of the initial charge and that of the incremental feed are determined by gas chromatography. The monomer composition (i.e. the mole percentage of copolymerized monomer units) in the fluoroelastomer copolymer prepared is determined by dissolving the fluoroelastomer in deutero-acetone and carrying out $^1H$ and $^{19}F$-NMR analysis, or by FTIR analysis of thin films. X-ray fluorescence is used to determine concentrations of bromine- and iodine-containing cure sites.

Another embodiment of this invention is the novel fluoroelastomers produced by the above suspension process of this invention. Such fluoroelastomers may be distinguished from fluoroelastomers made by a different polymerization process in that fluoroelastomers of this invention i) are substantially free of ionic endgroups (as defined above in the Summary of the Invention), ii) contain polymer chain endgroups derived from an oil-soluble organic peroxide polymerization initiator, and iii) contain copolymerized units of a cure site monomer. Emulsion-produced fluoroelastomers of similar copolymerized monomer unit composition as the fluoroelastomers of this invention will either have more than one milliequivalent of ionic endgroups per kg of fluoroelastomer, or the emulsion-produced fluoroelastomer will have endgroups derived from a water-soluble inorganic peroxide polymerization initiator (such as ammonium persulfate), or both.

The fluoroelastomers prepared by this invention are generally molded and vulcanized during fabrication into finished products such as seals, wire coatings, hose, etc. Suitable vulcanization methods employ polyol, polyamine, or organic peroxide compounds as curatives. Vulcanization with a polyol compound is especially advantageous because compression set resistance of the cured fluoroelastomer is generally better than that obtained using polyamine or peroxide curatives. Polyol curatives are particularly effective curatives for fluoroelastomers which contain copolymerized units of 2-HPFP cure site monomer, in particular fluoroelastomers comprising copolymerized units of 30–65 wt. % $VF_2$, 30–40 wt. % PMVE, 3–30 wt. % TFE and 0.5–3 wt. % 2-HPFP.

When peroxide curatives are used, resistance of the cured fluoroelastomers to chemicals such as acids or bases is markedly improved. Peroxide curatives are particularly useful for vulcanizing fluoroelastomers which contain either a bromine-, or iodine-containing cure site monomer. The latter type of fluoroelastomers which also have iodine or bromine at one or more polymer chain ends cure especially well with peroxide curatives. PMVE-containing fluoroelastomers comprising copolymerized units of 30–65 wt. % $VF_2$, 30–40 wt. % PMVE, 3–30 wt. % TFE and 0.5–3 wt. % of either BTFB, ITFB or allyl iodide are preferred peroxide-curable polymers. Fluoroelastomers containing copolymerized units of 30–65 wt. % $VF_2$, 25–40 wt. % HFP, 3–30 wt. % TFE and 0.5–3 wt. % of either BTFB, ITFB or allyl iodide are also preferred peroxide-curable polymers.

Any of the known polyol aromatic crosslinking agents that require accelerators for satisfactory cure rates are suitable for use with the fluoroelastomers prepared by the present invention. The crosslinking agent is usually added in amounts of from about 0.5–4 parts by weight per hundred parts by weight fluoroelastomer (phr), usually 1–2.5 phr. Preferred crosslinking agents are di- tri-, tetrahydroxybenzenes, naphthalenes, anthracenes and bisphenols of the formula

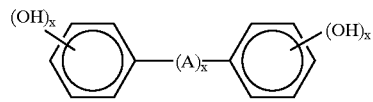

where A is a stable divalent radical, such as a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2 and any aromatic ring of the polyhydroxylic compound is optionally substituted with at least one atom of chlorine, fluorine, or bromine, a —CHO group, or a carboxyl or acyl radical (e.g. a —COR where R is OH or a $C_1$–$C_8$ alkyl, aryl, or cycloalkyl group). It will be understood from the above formula describing bisphenols that the —OH groups can be attached in any position (other than number one) in either ring. Blends of two or more such compounds can also be used.

Referring to the bisphenol formula shown in the previous paragraph, when A is alkylene, it can be, for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, and hexamethylene. When A is alkylidene, it can be for example ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylidene. When A is a cycloalkylene radical, it can be for example 1,4-cyclohexylene; 2-chloro-1,4-cyclohexylene; 2-fluoro-1,4-cyclohexylene; 1,3-cyclohexylene; cyclopentylene; chlorocyclopentylene; fluorocyclopentylene; and cycloheptylene. Further, A can be an arylene radical such as m-phenylene; p-phenylene; 2-chloro-1,4-phenylene; 2-fluoro-1,4-phenylene; o-phenylene; methylphenylene; dimethylphenylene; trimethylphenylene; tetramethylphenylene; 1,4-naphthylene; 3-fluoro-1,4-naphthylene; 5-chloro-1,4-naphthylene; 1,5-naphthylene; and 2,6-naphthylene.

Other useful crosslinking agents include hydroquinone, dihydroxybenzenes such as catechol, resorcinol, 2-methyl resorcinol, 5-methyl resorcinol, 2-methyl hydroquinone, 2,5-dimethyl hydroquinone; 2-t-butyl hydroquinone; and 1,5-dihydroxynaphthalene.

Additional polyol curing agents include alkali metal salts of bisphenol anions, quaternary ammonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF and the benzyltriphenylphosphonium salt of bisphenol AF. Quaternary ammonium and phosphonium salts of bisphenol anions and their preparation are discussed in U.S. Pat. Nos. 4,957,975 and 5,648,429.

In addition, derivatized polyol compounds, such as diesters, are useful crosslinking agents. Examples of such compositions include diesters of phenols, such as the diacetate of bisphenol AF, the diacetate of sulfonyl diphenol, and the diacetate of hydroquinone.

When cured with polyol compounds, the curable compositions will also generally include a cure accelerator. The most useful accelerators are quaternary phosphonium salts, quaternary alkylammonium salts, or tertiary sulfonium salts. Particularly preferred accelerators are n-tetrabutylammonium hydrogen sulfate, tributylallylphosphonium chloride and benzyltriphenylphosphonium chloride. Other useful accelerators include those described in U.S. Pat. Nos. 5,591,804; 4,912,171; 4,882,390; 4,259,463 and 4,250,278 such as tributylbenzylammonium chloride, tetrabutylammonium bromide, tetrabutylammonium chloride, benzyl tris(dimethylamino)phosphonium chloride; 8-benzyl-1,8-diazabicyclo[5,4,0]-7-undecenonium chloride, $[(C_6H_5)_2S^+(C_6H_{13})][Cl]^-$, and $[(C_6H_{13})_2S(C_6H_5)]^+[CH_3CO_2]^-$. In general, about 0.2 phr accelerator is an effective amount, and preferably about 0.35–1.5 phr is used.

If quaternary ammonium or phosphonium salts of bisphenols are used as curing agents, then addition of a cure accelerator is not necessary.

The polyol cure system will also contain a metal compound composed of a divalent metal oxide, such as magnesium oxide, zinc oxide, calcium oxide, or lead oxide, or a divalent metal hydroxide; or a mixture of the oxide and/or hydroxide with a metal salt of a weak acid, for example a mixture containing about 1–70 percent by weight of the metal salt. Among the useful metal salts of weak acids are barium, sodium, potassium, lead, and calcium stearates, benzoates, carbonates, oxalates, and phosphites. The amount of the metal compound added is generally about 1–15 phr, about 2–10 parts being preferred.

Polyamines and diamine carbamates are also useful curing agents for the compositions of the invention. Examples of useful polyamines include N,N'-dicinnamylidene-1,6-hexanediamine, trimethylenediamine, cinnamylidene trimethylenediamine, cinnamylidene ethylenediamine, and cinnamylidene hexamethylenediamine. Examples of useful carbamates are hexamethylenediamine carbamate, bis(4-aminocyclohexyl)methane carbamate, 1,3-diaminopropane monocarbamate, ethylenediamine carbamate and trimethylenediamine carbamate. Usually about 0.1–5 phr of the carbamate is used.

The peroxide vulcanization method can be exemplified as follows. To a fluoroelastomer prepared by this invention is added (a) an organic peroxide, (b) a polyfunctional unsaturated compound, and (c) a divalent metal hydroxide, a divalent metal oxide, or a combination of the two.

Organic peroxides suitable for use include: 1,1-bis(t-butylperoxy)-3,5,5-trimethylcyclohexane; 1,1-bis(t-butylperoxy)cyclohexane; 2,2-bis(t-butylperoxy)octane; n-butyl-4,4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha, alpha'-bis(t-butylperoxy-m-isopropyl)benzene; 2,5-dimethyl-2,5-di(t-butylperoxy)hexane; 2,5-dimethyl-2,5-di(t-butylperoxy)hexene-3; benzoyl peroxide, t-butylperoxybenzene; 2,5-dimethyl-2,5-di(benzoylperoxy)-hexane; t-butylperoxymaleic acid; and t-butylperoxyisopropylcarbonate. Preferred examples of the component organic peroxides include 2,5-dimethyl-2,5-di(t-butylperoxy)hexane, dicumyl peroxide, and alpha, alpha'-bis(t-butylperoxy-m-isopropyl)benzene. The amount compounded is generally in the range of 0.05–5 parts by weight, preferably in the range of 0.1–3 parts by weight per 100 parts by weight of the fluoroelastomer. This particular range is selected because if the peroxide is present in an amount of less than 0.05 parts by weight, the vulcanization rate is insufficient and causes poor mold release. On the other hand, if the peroxide is present in amounts of greater than 5 parts by weight, the compression set of the cured polymer becomes unacceptably high. In addition, the organic peroxides may be used singly or in combinations of two or more types.

Specific examples of the polyfunctional unsaturated compound used in the peroxide vulcanization method are triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, and N,N-diallylacrylamide. The amount compounded is generally in the range of 0.1–10 parts by weight per 100 parts by weight of the fluoroelastomer. This particular concentration range is selected because if the unsaturated compound is present in amounts less than 0.1 part by weight, crosslink density of the cured polymer is unacceptable. On the other hand, if the unsaturated compound is present in amounts above 10 parts by weight, it blooms to the surface during molding, resulting in poor mold release characteristics. The preferable range of unsaturated compound is 0.2–6 parts by weight per 100 parts fluoroelastomer. The unsaturated compounds may be used singly or as a combination of two or more types.

In addition, if necessary, other components, for example, fillers such as carbon black, Austin black, graphite, thermoplastic fluoropolymer micropowders, silica, clay, diatomaceous earth, talc, wollastonite, calcium carbonate, calcium silicate, calcium fluoride, and barium sulfate; processing aides such as higher fatty acid esters, fatty acid calcium salts, fatty acidamides (e.g. erucamide), low molecular weight polyethylene, silicone oil, silicone grease, stearic acid, sodium stearate, calcium stearate, magnesium stearate, aluminum stearate, and zinc stearate; coloring agents such as titanium white and iron red may be used as compounding additives. The amount of such filler compounded is generally in the range of 0.1–100 parts by weight, preferably 1–60 parts by weight, per 100 parts by weight of the fluoroelastomer. This range is selected because if the filler is present in amounts of less than 0.1 part by weight, there is little or no effect, while, on the other hand, if greater than 100 parts by weight are used, elasticity is sacrificed. The amount of processing aid compounded is generally less than 10 parts by weight, preferably less than 5 parts by weight, per 100 parts by weight of the fluoroelastomer. If the amount used is above the limit, heat resistance is adversely affected. The amount of a coloring agent compounded is generally less than 50 parts by weight, preferably less than 30 parts by weight per 100 parts by weight of the fluoroelastomer. If greater than 50 parts by weight is used, compression set suffers.

The fluoroelastomers prepared by the process of this invention are useful in many industrial applications including seals, wire coatings, tubing and laminates.

EXAMPLES

TEST METHODS

Limiting viscosity [η] was determined by dissolving a sample of the fluoroelastomer in methyl ethyl ketone to obtain a 0.1 g/100 ml solution, which was used in a capillary viscometer in measurements at 30° C.

Mooney viscosity, ML (1+10), was determined according to ASTM D1646 with an L (large) type rotor at 121° C., using a preheating time of one minute and rotor operation time of 10 minutes.

Cure Characteristics

Cure characteristics were measured, as indicated in the examples, using either an Alpha Technologies Ltd. oscillating disk rheometer (ODR) 2000E instrument, under conditions corresponding to ISO 3417 at 1° arc, 24 minutes, 180° C., sample size of 13–15 g; or an Alpha Technologies Ltd. MDR 2000E instrument under the following conditions: ISO 6502 at moving die frequency of 1.66 Hz, oscillation amplitude of ±0.5 degrees, temperature of 180° C., sample size of 7–8 g, and the duration of the test was 12 minutes. The following cure parameters were recorded:

$M_H$: maximum torque level, in units of dN·m $M_L$: minimum torque level, in units of dN·m $t_S2$: minutes to a 2.26 dNm rise above $M_L$ t50: minutes to 50% of maximum torque t90: minutes to 90% of maximum torque Tensile Properties Unless otherwise noted, stress/strain properties were measured on test specimens that had been press cured at 180° C. for 10 minutes and then post cured in a hot air oven for 24 hours at 200° C. The following physical property parameters were recorded; test methods are in parentheses:

$M_{100}$: modulus at 100% elongation in units of MPa (ISO 37)

$T_B$: tensile strength in units of MPa (ISO 37)

$E_B$: elongation at break in units of % (ISO 37)

$T_g$: glass transition temperature was measured by differential scanning calorimetry using a 10° C./minute heating rate.

Hardness (Shore A, ISO 868)

Compression set of small pip samples (ISO 815)

The invention is further illustrated by, but is not limited to, the following examples.

A polymerization reactor was configured for carrying out semibatch polymerizations. The gaseous monomer feed system and its operation consisted of a source line for each gaseous major monomer, flow controller for each gaseous monomer line, a compressor, an accumulator and a pressure controller between the accumulator and reactor vessel. At the beginning of the polymerization reaction, monomers were consumed in the reactor at a low rate. The monomer supply to the compressor was significantly larger in order to maintain an accurate monomer feed composition. The difference in the amount of materials fed to the compressor and the amount consumed in the reactor was stored in the accumulator, placed between the reactor and the compressor. The storage in the accumulator was controlled with a pressure controller, which was cascaded to several flow controllers metering the monomer mixture to the compressor. As monomers flowed into the accumulator, the pressure increased to a high preset limit. When the high limit was reached, the flow controllers closed the gaseous monomer supply valves. As monomers flowed into the reactor, the accumulator pressure dropped to a low limit. At the low limit, the monomer supply valves opened and compressed gases were fed into the accumulator until pressure reached the high set limit, which shut down the monomer feed. This cycle continued until the polymerization was terminated. An exponential digital filter was used to calculate the average flow rate of gaseous monomers during each period that the gaseous monomer valves were in the open position. The calculated average gaseous monomer flow rates were used to adjust the flow rate of the metering pump employed to pump liquid cure site monomer solution to the reactor during the same time periods.

Example 1

A semibatch suspension polymerization of this invention was carried out in a 40-liter reactor in order to produce Sample 1. The reactor was charged with 20 liters of an aqueous solution containing 0.07 wt. % (14 g) of methyl cellulose ($M_n$ approximately 17,000). The air in the vapor space was replaced first with nitrogen and then with 3500 grams of a monomer mixture (initial feed) containing 5.0 wt. % tetrafluoroethylene (TFE), 40.4 wt. % vinylidene fluoride ($VF_2$), and 54.6 wt. % perfluoro(methyl vinyl ether) (PMVE). The reactor contents were heated to 50° C. and pressurized with the above monomer mixture to 2.76 MPa. After reaching 2.76 MPa, the reactor pressure controller was set to operate automatically with a pressure target of 2.76 MPa.

During the monomer addition step, two solutions were prepared for the polymerization phase: a 45 wt. % solution of methylene iodide ($CH_2I_2$) in methyl acetate, and an initiator solution containing 20 wt. % diisopropyl peroxydicarbonate (IPP) in methyl acetate. The specific gravity of the iodide solution was 1.34. A liquid cure site monomer, 4-bromo-3,3,4,4,-tetrafluorobutene-1 (BTFB) was also used in the polymerization, with a goal of 0.6% incorporation in the polymer.

While holding the reactor pressure at 2.76 MPa and 50° C., the accumulator was pressurized to 3.10 MPa with an incremental feed gaseous monomer mixture comprising 15.1 wt. % TFE, 48.5 wt. % $VF_2$, and 36.8 wt. % PMVE. Once the accumulator reached 3.10 MPa, it was set to operate automatically off the pressure controller between 3.10 MPa and 3.03 MPa. At 3.10 MPa the monomer feed valves closed, and at 3.03 MPa the monomer feed valves were opened.

A quantity (14.5 ml) of the 45 wt. % methylene iodide solution (equivalent to 8.75 grams of $CH_2I_2$) was added to the reactor. After a few minutes, 50 grams of initiator solution (equivalent to 10 grams of IPP) were added. Immediately after the initiator addition, two metering pumps were programmed to deliver the methylene iodide, and BTFB solutions to the reactor at rates proportional to the gaseous monomer flow rates.

An additional 26.2 grams of CH2I$_2$ (43.4 ml of 45 wt. % solution) were added over the first 1,500 grams of total monomer consumed in the reactor. The iodide pump rate was set to deliver 2.89 ml per 100 grams of monomer, based on the calculated average monomer flow. Similarly, the BTFB pump was set to deliver an average 0.72 grams per 100 grams of monomer consumed in the reactor, based on the filtered value of the monomer flow.

The initial polymerization rate was 41 grams of polymer produced/hour and it increased to 717 grams/hour after 33 hours. Two additional portions of IPP solution were introduced to the reactor to maintain the polymerization rate: the equivalent of 3 grams of IPP at the $17^{th}$ hour, and 2 grams of IPP at the $22^{nd}$ hour. When the polymerization reaction was terminated, the total feed to the reactor included 15,000 grams of major monomers, 15 grams of IPP, 35 grams of CH$_2$I$_2$, and 107.8 grams of BTFB. Over 17 kg of polymer were produced having the properties shown in Table I.

TABLE I

| | |
|---|---|
| Inherent viscosity | 0.91 |
| Mooney viscosity, ML (1 + 10) (121° C.) | 73 |
| TFE, wt. % | 19.92 |
| VF$_2$, wt. % | 47.20 |
| PMVE, wt. % | 32.14 |
| BTFB, wt. % | 0.58 |
| Iodine, wt. % | 0.16 |
| T$_g$, ° C. | −32.1 |

Comparative Sample A was produced by a semibatch suspension polymerization process similar to that described above except that cure site monomer was omitted. Polymerization was carried out in the 40-liter reactor. The reactor was charged with 20 liters of an aqueous solution containing 0.07 wt. % of methyl cellulose. The air in the vapor space was replaced first with nitrogen, then with a monomer mixture (initial feed) containing 2.1 wt. % tetrafluoroethylene (TFE), 40.8 wt. % vinylidene fluoride (VF$_2$), and 57.1 wt. % perfluoro(methyl vinyl ether) (PMVE). The reactor contents were heated to 50° C. and pressurized with 3328 grams of the above monomer mixture to 2.66 MPa. After the pressure reached 2.66 MPa, the reactor pressure controller was set to operate automatically with a pressure target of 2.66 MPa.

During the monomer addition step, two solutions were prepared for the polymerization phase: a 45 wt. % solution of methylene iodide (CH$_2$I$_2$) in methyl acetate, and an initiator solution containing 15 wt. % IPP in methyl acetate. The specific gravity of the iodide solution was 1.39.

A gaseous incremental monomer mixture was fed to maintain constant reactor pressure at the controlled temperature of 50° C. Incremental feed contained 11.1 wt. % TFE, 54.2 wt. % VF$_2$, and 34.7 wt. % PMVE.

A quantity (11.3 ml) of the 45 wt. % iodide solution was added to the reactor (equivalent to 7.0 grams of CH$_2$I$_2$). After a few minutes, 55.3 grams of the initiator solution were added (equivalent to 8.3 grams of IPP). Immediately after the initiator addition, a metering pump was programmed to deliver the iodide solution to the reactor at rates proportional to the gaseous monomer flow rates.

A further 28.2 grams of CH$_2$I$_2$ (45.0 ml of 45 wt. % solution) were added in addition to the first 1,081 grams of total monomer consumed in the reactor. The iodide pump rate was set to deliver 4.50 ml per 100 grams of gaseous major monomer, based on the calculated average gaseous major monomer flow.

The initial polymerization rate was 14 grams of polymer produced/hour and it increased to 2000 grams/hour after 33 hours. A further addition of 4.1 grams of IPP was made at the $13^{th}$ hour. At the termination of the reaction, the total feed to the reactor included 14,009 grams of monomer, 12.4 grams of IPP, and 35.2 grams of CH$_2$I$_2$. Over 14.8 kg of polymer were produced having the properties shown in Table II.

TABLE II

| | |
|---|---|
| Inherent viscosity | 0.71 |
| Mooney viscosity, ML (1 + 10) (121° C.) | 32 |
| TFE, wt. % | 12.35 |
| VF$_2$, wt. % | 53.19 |
| PMVE, wt. % | 34.27 |
| Iodine, wt. % | 0.19 |
| T$_g$, ° C. | −30 |

Portions of the Sample 1 and Comparative Sample A polymers were compounded on a 2-roll rubber mill in the proportions shown in Table III. Curing characteristics and tensile properties of the cured polymers are also shown in Table III. The Sample 1 polymer, prepared by the suspension polymerization process of this invention with controlled incorporation of a cure site monomer, exhibits a much higher cure state (as evidenced by M$_H$) and improved physical properties compared to Comparative Sample A which was prepared according to the suspension polymerization process of the prior art.

TABLE III

| Formulation, phr[1]: | Sample 1 | Comp. Sample A |
|---|---|---|
| Polymer | 100 | 100 |
| MT Black, Thermax FF N990 | 30 | 30 |
| Ca(OH)$_2$, Rhenofit CF | 5 | 5 |
| Triallyl isocyanurate | 2.7 | 2.7 |
| Peroxide, Luperox 101XL 45 | 3.75 | 3.75 |
| Process aid, Armeen 18D | 0.5 | 0.5 |
| Process aid, VPA 2[2] | 1 | 1 |
| Cure Characteristics (ODR): | | |
| M$_L$, dN · m | 6.9 | 3.4 |
| M$_H$, dN · m | 59.7 | 45.7 |
| T$_S$2, minutes | 0.72 | 0.83 |
| T50, minutes | 1.24 | 1.25 |
| T90, minutes | 2.84 | 2.72 |
| Tensile Properties | | |
| T$_B$, MPa | 17.3 | 14.9 |
| E$_B$, % | 224 | 431 |
| M$_{100}$, MPa | 5.5 | 2.7 |
| Hardness, Shore A | 74 | 70 |
| Compression set, % 70 h/200° C. | 25 | 47 |

[1]"phr" denotes parts by weight per hundred parts rubber
[2]Rice bran wax (available from DuPont Dow Elastomers L.L.C.)

Example 2

Sample 2 was prepared by the process of this invention in the following manner. The 40-liter reactor of Example 1 was charged with 20 liters of water containing 14 g methyl cellulose (M$_n$ about 17,000) and was heated to 50° C. Gaseous monomers were charged as listed below to bring the reactor pressure to 2.56 MPa:

| Monomer | Amount, g | Wt. % |
|---|---|---|
| TFE | 183 | 6.3 |
| VF$_2$ | 872 | 29.8 |
| HFP | 1870 | 63.9 |
| Total | 2925 | |

The polymerization was initiated by adding a solution of 20 g IPP in 80 g methyl acetate. A solution of 36 g methylene iodide in 44 g methyl acetate was also charged to the reactor. Approximately one third of the methylene iodide solution was added at initiation and the balance was added during the feed of the first 1800 g of incremental monomer.

A gaseous incremental major monomer mixture was fed in a manner that maintained constant reactor pressure at the controlled temperature of 50° C. Liquid cure site monomer BTFB was fed in a controlled ratio to the incremental gaseous monomer feed, according to the procedure of Example 1. BTFB was initially fed at a ratio of 0.35 wt. % of incremental monomer. The ratio was gradually increased to 0.75 wt. %. This resulted in an overall average ratio of 0.60 wt. %, based on total incremental monomer fed. Polymerization rate was approximately equal to incremental feed rate and increased from approximately 100 g/h initially to approximately 1000 g/h after 10 hours. A total of 14,278 g incremental monomer was fed over a 20-hour reaction period in the amounts shown:

| Monomer | Amount, g | Wt. % |
|---|---|---|
| TFE | 2736 | 19.2 |
| VF$_2$ | 7056 | 49.4 |
| HFP | 4486 | 31.4 |
| Total | 14278 | |

The polymerization was terminated after 20 hours by discontinuing the incremental monomer feed. The resulting polymer slurry was filtered and washed. Total polymer recovery was 15,435 g. Major monomer composition was determined by FTIR. Concentration of iodine and bromine cure sites was determined by x-ray fluorescence. Polymer composition was 22.1 wt. % TFE, 51.4 wt. % VF2, 25.7 wt. % HFP, 0.54 wt. % BTFB, and 0.20 wt. % I. These values were close to the goal composition set by incremental monomer feeds. Polymer inherent viscosity was 0.73, ML-10 (121° C.) was 42, and $T_g$ was −19° C.

As in Example 1, addition of cure site monomer BTFB in a closely controlled ratio to the incremental gaseous monomer feed allowed the polymerization to proceed at a satisfactory rate to form a high molecular weight polymer having a homogeneous distribution of cure sites for good curing characteristics.

Example 3

The 40-liter reactor of Example 1 was charged with 20 liters of water containing 14 g methyl cellulose ($M_n$ about 17,000). The reactor contents were heated to 50° C. Gaseous monomers were charged in the amounts listed below to bring the reactor pressure to 2.14 MPa:

| Monomer | Amount, g | Wt. % |
|---|---|---|
| TFE | 125 | 5.0 |
| VF$_2$ | 625 | 25.0 |
| PMVE | 1000 | 40.0 |
| 2-HPFP | 750 | 30.0 |
| Total | 2500 | |

The polymerization was initiated by adding a solution of 40 g IPP in 160 g methyl acetate.

A gaseous incremental monomer mixture was fed in a manner so as to maintain constant reactor pressure at the controlled temperature of 50° C. The gaseous cure site monomer, 2H-pentafluoropropylene (2-HPFP), was fed along with the major gaseous monomers. Incremental feed rate increased from about 500 g/h initially to about 2900 g/h after 4 hours, corresponding to the maximum output of the compressor. Polymerization rate increased to approximately 3460 g/h at the end of the reaction period of 6 hours. Reactor pressure decreased to 1.36 MPa as a portion of the initial monomer charge reacted. A total of 12,520 g incremental monomer was fed over a 6-hour reaction period in amounts shown below:

| Monomer | Amount, g | Wt. % |
|---|---|---|
| TFE | 1252 | 10.0 |
| VF$_2$ | 6751 | 54.0 |
| PMVE | 4257 | 34.0 |
| 2H-PFP | 250 | 2.0 |
| Total | 12,520 | |

The polymerization was terminated after 6 hours by discontinuing the incremental monomer feed. The resulting polymer slurry was filtered and washed. Total polymer (Sample 3) recovery was 14,280 g. Polymer composition and properties are shown in Table IV. The ratio of 2-HPFP to PMVE was determined by $^{19}$F NMR.

TABLE IV

| | |
|---|---|
| Inherent viscosity | 0.95 |
| Mooney viscosity, ML (1 + 10) (121° C.) | 71 |
| TFE, wt. % | 11.4 |
| VF$_2$, wt. % | 52.6 |
| PMVE, wt. % | 33.7 |
| 2-HPFP, wt. % | 2.3 |
| $T_g$, ° C. | −29 |

A VF$_2$/TFE/PMVE/2-HPFP copolymer (Comparative Sample B) was prepared by emulsion polymerization in a 2-liter continuous stirred tank reactor at 110° C., 6.2 MPa with a residence time of 40 minutes. Several aqueous solutions were fed to the reactor at a rate of 3.00 liters/hour so as to introduce into the reactor 1.27 g/hour ammonium persulfate initiator, 0.91 g/hour NaOH, 1.70 g/hour ammonium perfluorooctanoate surfactant, and 0.35 g/hour isopropyl alcohol transfer agent. Monomers were fed to the reactor at a rate of 836 g/hour, the feed stream being composed of 7.0 wt. % TFE, 53.1 wt. % VF$_2$, 36.8 wt. % PMVE, and 3.1 wt. % 2-HPFP. Polymerization rate was 812 g/hour at 97% conversion producing an emulsion containing 21.4 wt. % solids.

Polymer was isolated by coagulation with potassium aluminum sulfate solution, followed by washing and drying of the crumb. Polymer composition was 7.2 wt. % TFE, 54.1 wt. % $VF_2$, 36.8 wt. % PMVE, and 1.9 wt. % 2-HPFP. Mooney viscosity, ML-10 (121° C.), was 98.

The Sample 3 and Comparative Sample B polymers were compounded on a 2-roll mill with curative, filler and process aid in the proportions shown in Table V. Curing characteristics and tensile properties of the cured polymers are also shown in Table V. Physical properties of the cured polymers of this example were measured on samples which had been press cured for 4 minutes at 180° C. and then post cured in an air oven for 24 hours at 230° C.

Sample 3 (suspension polymer) having no ionic endgroups cured faster and gave lower compression set than the emulsion polymer (Comparative Sample B), having ionic endgroups.

TABLE V

| Formulation, phr: | Comp. Sample B | Sample 3 |
|---|---|---|
| Polymer | 100 | 100 |
| Tremin 283600 EST filler[3] | 45 | 45 |
| MT Black, Thermax FF N990 | — | 2.5 |
| $TiO_2$, Ti-Pure R960 | 2 | — |
| Cromophtal Blue 4GNP[4] | 2.5 | — |
| Calcium Oxide VG | 6.0 | 6.0 |
| MgO, Elastomag 170 | 1.0 | 1.0 |
| Molecular Sieve 13X | 3.0 | 3.0 |
| Bisphenol AF | 2.0 | 2.0 |
| Tetrabutyl ammonium hydrogen sulfate | 0.4 | 0.5 |
| Process aid, VPA 2[2] | 1.0 | 1.0 |
| Cure Characteristics (MDR): | | |
| $M_L$, dN · m | 3.6 | 3.0 |
| $M_H$, dN · m | 25.2 | 27.7 |
| $T_S2$, minutes | 0.53 | 0.33 |
| T90, minutes | 2.24 | 1.51 |
| Tensile Properties | | |
| $T_B$, MPa | 12.2 | 12.2 |
| $E_B$, % | 141 | 156 |
| $M_{100}$, MPa | 9.4 | 8.7 |
| Hardness, Shore A | 74 | 74 |
| Compression set, % 70 h/200° C. | 42 | 37 |

[3]Epoxysilane treated wollastonite mineral filler
[4]Blue pigment

Example 4

The 40-liter reactor of Example 1 was charged with 20 liters of water containing 14 g methyl cellulose ($M_n$ about 17,000) and the contents were heated to 50° C. Gaseous monomers were charged in the amounts shown below to bring the reactor pressure to 1.55 MPa:

| Monomer | Amount, g | Wt. % |
|---|---|---|
| TFE | 45 | 3.0 |
| $VF_2$ | 405 | 27.0 |
| PMVE | 600 | 40.0 |
| 2-HPFP | 450 | 30.0 |
| Total | 1500 | |

The polymerization was initiated by adding a solution of 40 g IPP in 160 g methyl acetate.

A gaseous incremental monomer mixture was fed to the reactor in a manner so as to maintain constant reactor pressure at the controlled temperature of 50° C. The gaseous cure site monomer, 2H-pentafluoropropylene (2-HPFP), was fed along with the major gaseous monomers. Incremental feed rate, approximately equal to polymerization rate, increased from about 176 g/hour initially to about 1956 g/hour at the termination of the polymerization period of 10.7 hours. A total of 12,000 g incremental monomer was fed over the 10.7-hour reaction period in the amounts shown below:

| Monomer | Amount, g | Wt. % |
|---|---|---|
| TFE | 480 | 4.0 |
| $VF_2$ | 6960 | 58.0 |
| PMVE | 4320 | 36.0 |
| 2-HPFP | 240 | 2.0 |
| Total | 12,000 | |

The polymerization was terminated after 10.7 hours by discontinuing the incremental monomer feed. The resulting polymer slurry was filtered and washed. Total polymer (Sample 4) recovery was 12.0 kg. Polymer composition and properties are shown in Table VI. The ratio of 2-HPFP to PMVE was determined by $^{19}F$ NMR.

TABLE VI

| Inherent viscosity | 0.81 |
|---|---|
| Mooney viscosity, ML (1 + 10) (121° C.) | 43 |
| TFE, wt. % | 3 |
| $VF_2$, wt. % | 59 |
| PMVE, wt. % | 36 |
| 2-HPFP, wt. % | 2 |
| $T_g$, ° C. | −31 |

The curing characteristics and physical properties of cured compounds (mixed on a 2-roll rubber mill) are shown in Table VII for the bisphenol-curable polymer of Sample 4 and Comparative Sample C, Viton® GLT fluoroelastomer (commercially available from DuPont Dow elastomers L.L.C.), a peroxide-curable fluoroelastomer prepared by continuous emulsion polymerization. The polymer of Comparative Sample C has an approximate composition 10 wt. % TFE, 54 wt. % $VF_2$, 35 wt. % PMVE, and 1.2 wt. % BTFB, and has an ML-10 (121° C.) of about 90. Physical properties of the cured compositions were measured on samples which had been press cured for 4 minutes at 180° C. and then post cured in an air oven for 24 hours at 230° C.

Cure rate and physical properties of the bisphenol-curable suspension polymer (Sample 4) were similar to those of Comparative Sample C, the commercial peroxide-curable polymer GLT. However, the bisphenol-curable compound gave much improved mold release and better retention of properties after heat aging at 250° C.

TABLE VII

| Formulation, phr: | Comp. Sample C | Sample 4 |
|---|---|---|
| Polymer | 100 | 100 |
| Tremin[2] 283600 EST filler[3] | 45 | 45 |
| MT Black, Thermax FF N990 | 2.5 | 2.5 |
| Calcium Oxide VG | — | 6.0 |
| MgO, Elastomag 170 | — | 1.0 |
| Molecular Sieve 13X | — | 3.0 |
| Bisphenol AF | — | 2.0 |
| Tetrabutyl ammonium hydrogen sulfate | — | 0.5 |
| $Ca(OH)_2$, Rhenofit CF | 5 | — |
| Peroxide, Luperox 101XL 45 | 2 | — |

TABLE VII-continued

| Formulation, phr: | Comp. Sample C | Sample 4 |
|---|---|---|
| Triallyl isocyanurate, Diak 7 | 4 | — |
| Process aid, Armeen 18D | 0.5 | — |
| Process aid, VPA 2 | 1.0 | 1.0 |
| Cure Characteristics (MDR): | | |
| $M_L$, dN · m | 3.9 | 2.2 |
| $M_H$, dN · m | 22.9 | 23.8 |
| $T_S2$, minutes | 0.52 | 0.29 |
| T50, minutes | 0.93 | 0.42 |
| T90, minutes | 2.74 | 2.70 |
| Tensile Properties | | |
| $T_B$, MPa | 18.5 | 12.0 |
| $E_B3$, % | 153 | 176 |
| $M_{100}$, MPa | 14.3 | 8.2 |
| Hardness, Shore A | 75 | 74 |
| Compression set, % 70 h/200° C. | 32 | 37 |

What is claimed is:

1. A fluoroelastomer prepared by a suspension polymerization process, said fluoroelastomer having a selected molar ratio of copolymerized monomer units, said fluoroelastomer comprising copolymerized units of vinylidene fluoride major monomer, at least one other copolymerizable fluorinated major monomer, and at least one cure site monomer, said fluoroelastomer having endgroups of fragments derived from an organic oil-soluble peroxide, and said fluoroelastomer containing less than 1 milliequivalent of ionic or ionizable endgroups per kg fluoroelastomer, said process comprising the steps of:

(A) charging a reactor with a quantity of an aqueous medium comprising a suspension stabilizer, said suspension stabilizer being present in said aqueous medium at a concentration of 0.001 to 3 parts by weight per 100 parts of said aqueous medium, said quantity of aqueous medium being such that a sufficient vapor space is left in said reactor for receiving gaseous monomer;

(B) charging the vapor space in said reactor with an initial quantity of a gaseous monomer mixture comprising vinylidene fluoride major monomer and at least one other fluorinated major monomer; and continuously mixing said aqueous medium and said monomer mixture to form a dispersion;

(C) initiating polymerization of said monomers at a temperature of 45° C. to 70° C. by adding to said dispersion an oil soluble organic peroxide polymerization initiator in an amount of 0.001 to 5 parts by weight per 100 parts of said aqueous medium, said initiator being added as a solution consisting essentially of 0.1 to 75 wt. % of an oil soluble organic peroxide in a water-soluble hydrocarbon solvent; and (D) incrementally feeding to said reactor, during polymerization, so as to maintain a constant pressure in said reactor, said major monomers and at least one cure site monomer, said major monomers and said cure site monomer being fed to the reactor in said selected molar ratio until a fluoroelastomer product having a number average molecular weight of between 50,000 to 2,000,000 daltons is obtained.

2. A fluoroelastomer of claim 1 wherein at least one of said other copolymerizable fluorinated major monomers is selected from the group consisting of hexafluoropropylene, tetrafluoroethylene, chlorotrifluoroethylene and a perfluoro (alkyl vinyl) ether.

3. A fluoroelastomer of claim 1 wherein said cure site monomer is selected from the group consisting of 2-hydropentafluoropropylene, a non-conjugated diene, a bromine-containing olefin, an iodine-containing olefin, a bromine-containing unsaturated ether, and an iodine-containing unsaturated ether.

4. A fluoroelastomer of claim 1 comprising copolymerized units of 30–65 wt. % vinylidene fluoride, 30–40 wt. % perfluoro(methyl vinyl) ether, 3–30 wt. % tetrafluoroethylene and 0.5–3 wt. % of a cure site monomer selected from the group consisting of 2-hydropentafluoropropylene; 4-bromo-3,3,4,4-tetrafluorobutene-1;4-iodo-3,3,4,4-tetrafluorobutene-1; and allyl iodide.

5. A fluoroelastomer of claim 1 comprising copolymerized units of 30–65 wt. % vinylidene fluoride, 25–40 wt. % hexafluoropropylene, 3–30 wt. % tetrafluoroethylene and 0.5–3 wt. % of a cure site monomer selected from the group consisting of 4-bromo-3,3,4,4-tetrafluorobutene-1; 4-iodo-3,3,4,4-tetrafluorobutene-1; and allyl iodide.

6. A fluoroelastomer of any one of claims 1 to 5 characterized by having at least one endgroup per fluoroelastomer polymer chain selected from the group consisting of iodine-containing endgroups and bromine-containing endgroups.

* * * * *